US006626757B2

(12) United States Patent
Oliveras

(10) Patent No.: US 6,626,757 B2
(45) Date of Patent: Sep. 30, 2003

(54) POKER PLAYING SYSTEM USING REAL CARDS AND ELECTRONIC CHIPS

(76) Inventor: R. Martin Oliveras, 7 Bell Dr., Morristown, NJ (US) 07960

( * ) Notice: Subject to any disclaimer, the term of this patent is extended or adjusted under 35 U.S.C. 154(b) by 107 days.

(21) Appl. No.: 09/861,504

(22) Filed: May 21, 2001

(65) Prior Publication Data

US 2002/0173352 A1 Nov. 21, 2002

(51) Int. Cl.[7] .............................. A63F 1/18; A63F 13/12
(52) U.S. Cl. .............................................. 463/13; 463/26
(58) Field of Search ................................ 463/13, 25, 26

(56) References Cited

U.S. PATENT DOCUMENTS

| | | | |
|---|---|---|---|
| 4,494,197 A | 1/1985 | Troy | 463/18 |
| 4,760,527 A | 7/1988 | Sidley | 463/13 |
| 4,926,327 A | 5/1990 | Sidley | 463/13 |

*Primary Examiner*—Andrew M. Dolinar

(57) ABSTRACT

According to a first embodiment of the present invention, a system for playing poker comprises: a central processing unit; a plurality of player consoles; a plurality of first interconnecting means for connecting said central processing unit to each of said player consoles; said central processing unit being capable of enabling a particular player console so that said enabled player console may send wagering information to said central processing unit only while said particular player console is enabled; and said central processing unit being capable of simultaneously dis-enabling the other player consoles so that said other dis-enabled player consoles may not be able to send any wagering information to said central processing unit while said other player consoles are dis-enabled. According to a second embodiment of the present invention, a system for allowing a plurality of players to play poker against each other at each of several poker tables comprises: a central processing unit; a main console; a dealer console and a plurality of player consoles being located at each such poker table; a plurality of first interconnecting means for connecting each player console at each such poker table to said central processing unit; a plurality of second interconnecting means for connecting each dealer console at each such poker table to said central processing unit; third interconnecting means for connecting said main console to said central processing unit; each player console at each such poker table further comprising means controlled by said central processing unit for allowing each such player console at each such poker table to send wagering information relating to a check, fold, call, bet or raise to said central processing unit when such player console is enabled by said central processing unit, all other player consoles at such poker table being simultaneously dis-enabled by said central processing unit while such player console is enabled.

37 Claims, 6 Drawing Sheets

Figure 7 10
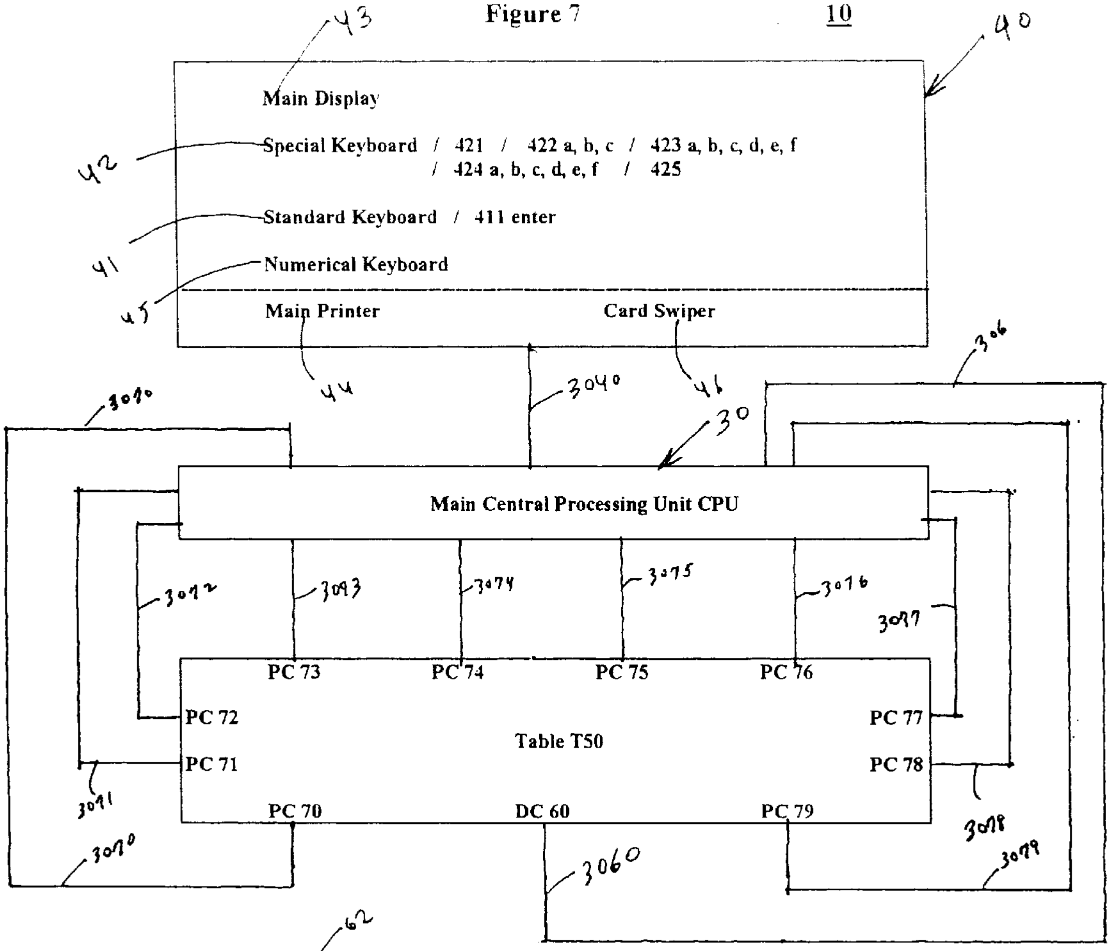
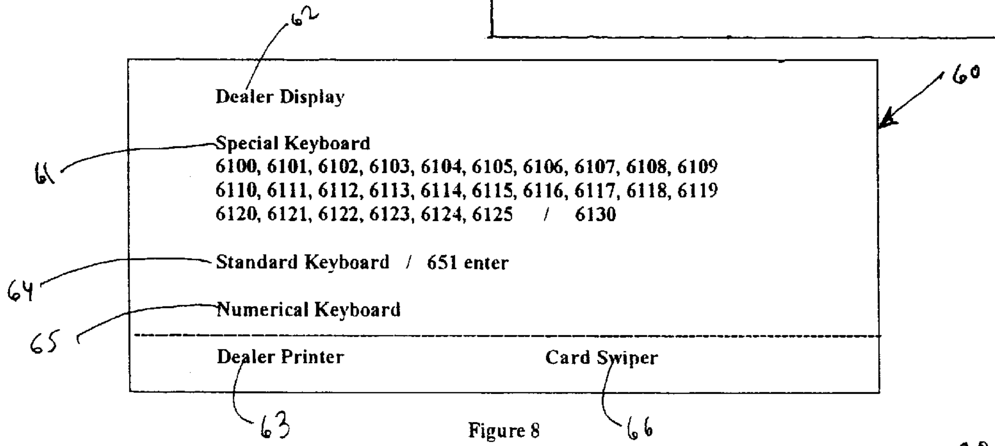
Figure 8
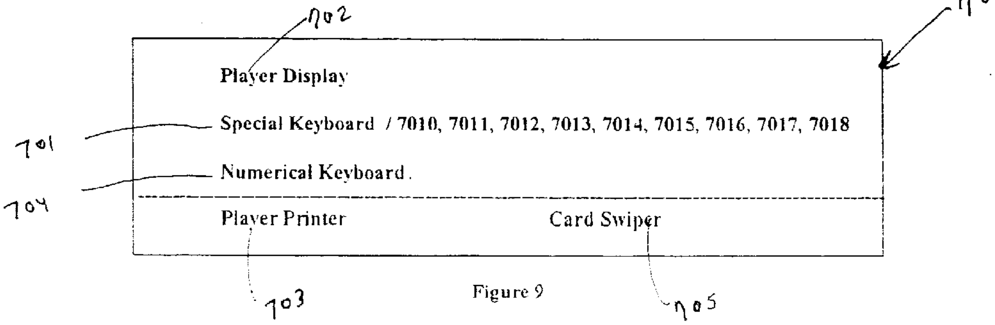
Figure 9

Player Display / $100 / Check / $100
Special Keyboard / Check / Call / Bet / Raise / Fold / Re-Buy / Terminate / Tip / Negate

Figure 10a

Player Display / $100 / Call $20 / $80
Special Keyboard / Check / Call / Bet / Raise / Fold / Re-Buy / Terminate / Tip / Negate

Figure 11a

Player Display / $100 / Bet $20 / $80
Special Keyboard / Check / Call / Bet / Raise / Fold / Re-Buy / Terminate / Tip / Negate

Figure 12a

Player Display / $100 / Raise $40 / $60
Special Keyboard / Check / Call / Bet / Raise / Fold / Re-Buy / Terminate / Tip / Negate

Figure 13a

Player Display / $100 / Fold / $100
Special Keyboard / Check / Call / Bet / Raise / Fold / Re-Buy / Terminate / Tip / Negate

Figure 14a

Player Display / $100 / Re-Buy $100 / $200
Special Keyboard / Check / Call / Bet / Raise / Fold / Re-Buy / Terminate / Tip / Negate

Figure 15a

Player Display / $100 / Terminate / $100
Special Keyboard / Check / Call / Bet / Raise / Fold / Re Buy / Terminate / Tip / Negate

Figure 16a

Player Display / $100 / Tip $1 / $99
Special Keyboard / Check / Call / Bet / Raise / Fold / Re-Buy / Terminate / Tip / Negate

Figure 17a

Player Display / $100 / Bet $20 / $80 / Negate / $100
Special Keyboard / Check / Call / Bet / Raise / Fold / Re-Buy / Terminate / Tip / Negate

Figure 18a

| |
|---|
| Dealer Display / $150 / PC70 Check / $150 |

Figure 10b

| |
|---|
| Dealer Display / $150 / PC70 Call $20 / $170 |

Figure 11b

| |
|---|
| Dealer Display / $150 / PC70 Bet $20 / $170 |

Figure 12b

| |
|---|
| Dealer Display / $150 / PC 70 Raise $40 / $190 |

Figure 13b

| |
|---|
| Dealer Display / $150 / PC70 Fold / $150 |

Figure 14b

| |
|---|
| Dealer Display / PC70 Re-Buy $100 / $200 |

Figure 15b

| |
|---|
| Dealer Display / PC70 Terminate / $100 |

Figure 16b

| |
|---|
| Dealer Display / PC70 Tip $1 / $99 |

Figure 17b

| |
|---|
| Dealer Display / PC70 Negate / $100 |

Figure 18b

| |
|---|
| Dealer Display / PC70 Button / $100 |

Figure 22a

| |
|---|
| Dealer Display / PC71 Little Blind / $95 |

Figure 22b

| |
|---|
| Dealer Display / PC72 Big Blind / $90 |

Figure 22c

POKER PLAYING SYSTEM USING REAL CARDS AND ELECTRONIC CHIPS

BACKGROUND OF THE INVENTION

1. Field of the Invention

This invention relates to a poker playing system and in particular to such a system using real cards and electronic chips.

2. Description of the Prior Art

Poker has experienced an upsurge in popularity over the past several years. This upsurge in poker popularity has occurred mostly in legalized casinos in Nevada, California, Atlantic City, Mississippi, Europe and elsewhere. The poker game with the biggest upsurge in popularity has been limit Texas Hold-Em (hereinafter limit Holdem).

Poker is a game of skill, luck and psychology. Poker is best played and is most exciting when played by live players against each other using real cards at the same poker table. It is the handling of the money and the chips by the players and the poker dealer that slows down the poker game.

Many casinos do not offer poker. Casinos prefer to offer other casino games for the following reasons:

Poker is too labor intensive.

Poker rooms take up too much space.

Poker makes too little money for the casino.

Many prior art card-playing systems disclose either new card games or modified traditional card games. Many prior art card-playing systems disclose the use of electronic cards and electronic chips all controlled and/or generated by a central computer. Many prior art card playing systems allow numerous players to participate in the card game from remote locations. One prior art example is Sidley U.S. Pat. No. 4,760,527 entitled "System For Interactively Playing Poker With A Plurality Of Players". Sidley discloses a central processing unit for allowing all players to simultaneously make one of a plurality of responses to a set of wagers of any plurality of players; and means to electronically assign one of more cards to the plurality of players. Another prior art example is Sidley U.S. Pat. No. 4,926,327 entitled "Computerized Gaming System" wherein Sidley discloses a similar system. Finally, Tray U.S. Pat. No. 4,494,197 entitled "Automatic Lottery System" discloses a lottery system free of player skill wherein the central processing unit pre-selects what particular play will be a winning play. None of the cited prior art patents disclose the "Poker Playing System Using Real Cards and Electronic Chips" of the present invention which preserves the live poker game using real cards.

SUMMARY OF THE INVENTION

According to a first embodiment of the present invention, a system for playing poker comprises: a central processing unit; a plurality of player consoles; a plurality of first interconnecting means for connecting said central processing unit to each of said player consoles; said central processing unit being capable of enabling a particular player console so that said enabled player console may send wagering information to said central processing unit only while said particular player console is enabled; and said central processing unit being capable of simultaneously dis-enabling the other player consoles so that said other dis-enabled player consoles may not be able to send any wagering information to said central processing unit while said other player consoles are dis-enabled. According to a second embodiment of the present invention, a system for allowing a plurality of players to play poker against each other at each of several poker tables comprises: a central processing unit; a main console; a dealer console and a plurality of player consoles being located at each such poker table; a plurality of first interconnecting means for connecting each player console at each such poker table to said central processing unit; a plurality of second interconnecting means for connecting each dealer console at each such poker table to said central processing unit; third interconnecting means for connecting said main console to said central processing unit; each player console at each such poker table further comprising means controlled by said central processing unit for allowing each such player console at each such poker table to send wagering information relating to a check, fold, call, bet or raise to said central processing unit when such player console is enabled by said central processing unit, all other player consoles at such poker table being simultaneously dis-enabled by said central processing unit while such player console is enabled.

Objects of the present invention are therefor to:

Allow the poker dealer to be more efficient.

Allow the poker dealer to deal more hands per unit time.

Allow the casino to make more money per poker table and per unit time.

Allow the poker manager to monitor poker dealer performance.

Allow the poker manager to monitor the number of hands dealt by the poker dealer per unit time.

Allow the poker manager to monitor casino rake (income) per poker table and per unit time.

Allow the poker manager to remotely monitor the number of players per poker table.

Allow the poker manager to better distribute the number of players per poker table.

Allow the poker dealer to manage each poker hand without having to physically handle poker chips, without having to physically count poker chips, without having to physically distribute poker chips to the winning players, and without having to physically handle money.

Allow players to enter and leave a poker game without having to physically carry chips to and from the poker table.

Allow players to enter and leave a poker game without having to physically purchase chips from the poker manager or from the poker dealer at the poker table.

Allow the players to play a poker hand with real cards and with no physical poker chips.

Allow only one poker player at a time to make a wager such as a check, fold, call, bet or raise and not allow all other players at the poker table from making a wager at the same time.

Advantages of the present invention are therefor that:

It makes the poker dealer more efficient

It speeds up the poker game.

It does not require the physical placement of poker chips at the middle of the poker table during a poker hand.

It can be applied to all limits of Texas Holdem, Omaha and other poker games.

BRIEF DESCRIPTION OF THE DRAWINGS

The above and other objects, advantages and features of the present invention will be further appreciated from a reading of the following detailed description in conjunction with the drawing in which:

FIG. 7 shows system 10 of the present invention including a detailed view of main console 40 plus the layout of dealer console 60 and player consoles 70–79 at poker table T50.

FIG. 8 shows a detailed view of dealer console 60 of the present invention.

FIG. 9 shows a detailed view of player console 70 of the present invention.

FIGS. 10*a*–18*a* show various touch-responsive screens of player display 702 allowing the respective wager actions or other actions at player console 70 according to the present invention.

FIGS. 10*b*–18*b* show the various output screens of dealer display 62 relating to the respective wager actions at player console 70 according to the present invention.

FIGS. 22*a*–22*c* show the displays of player consoles PC 70–72 indicating the button BU, the little blind LB, and the big blind BB designations at the beginning of a sample poker hand according to the present invention.

DETAILED DESCRIPTION OF THE INVENTION

Figure 1:
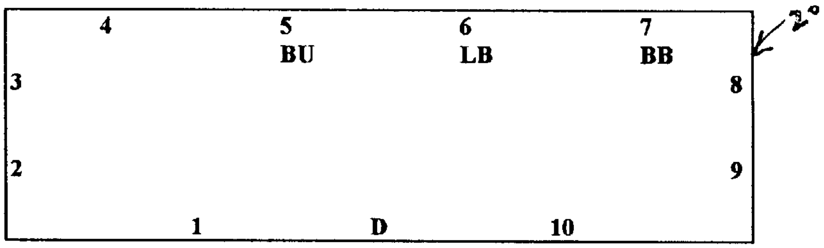
FIGS. 1–5 are top views of poker table 20 showing how a limit Holdem poker hand is played.
Figure 2:
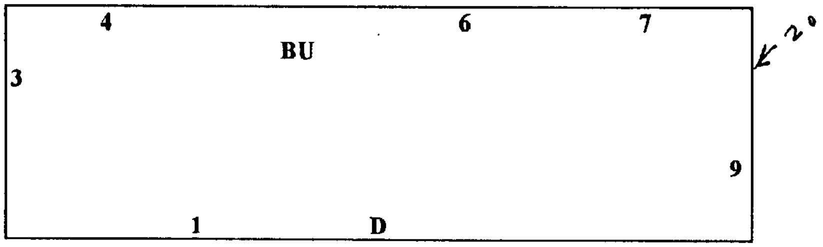
Figure 3:
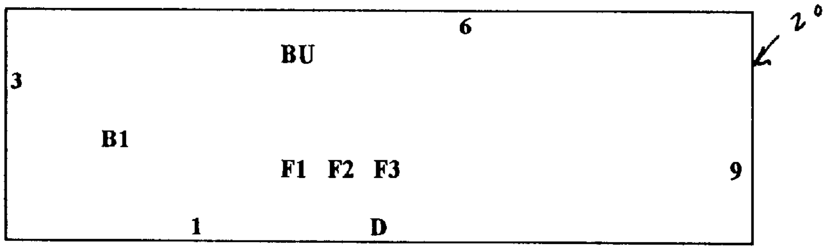
Figure 4:
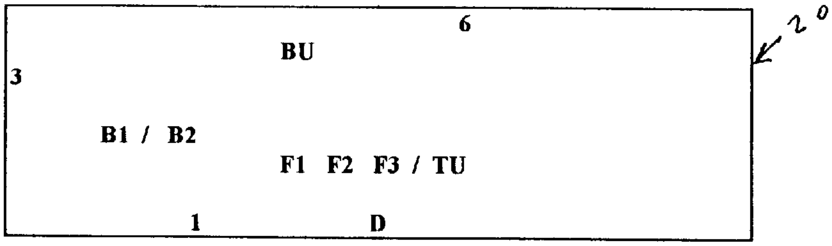
Figure 5:
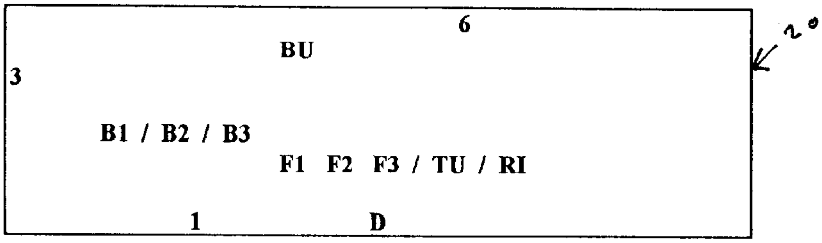

Limit Holdem is played by up to 10 players on an oval-shaped poker table. The casino dealer sits in the middle of one of the long sides of the table. The betting limits are set by the casino. The most popular Holdem limits are: \$5/\$10; \$10/\$20; \$15/\$30; \$20/\$40; \$30/\$60; and \$50/\$100. The first \$ amount is the "big blind" amount. In \$10/\$20 limit Holdem, the big blind is \$10. The "little blind" amount is \$5. During the 1st and 2nd betting rounds of a poker hand, the defined bet is \$10 plus up to a possible 3 raises for a total maximum bet of \$40. During the 3rd and 4th betting rounds, the defined bet is \$20 plus up to a possible 3 raises for a total maximum bet of \$80.

The following detailed description relates to \$10/\$20 limit Holdem. Each hand of limit Holdem involves several steps taken by the casino dealer and up to four betting rounds effected by the players. The order of dealing by the casino dealer and the order of betting by the players are controlled by the designated player position called the "button". The player who is the button is designated by a round white plastic button which is physically placed in front of that player so that the casino dealer and all the other players know which player is the button.

In \$10/\$20 limit Holdem, each player initially buys poker chips for no less than the minimum amount set by the casino (such as \$100) and up to \$1,000 or more at the discretion of the player. Each player now has a stack of chips for playing each hand of poker. Before the beginning play (before the first hand is dealt and played), the casino dealer deals each player one card face-up in clockwise order starting with the first player to the left of the dealer. The player who is dealt the highest-ranking card face-up is designated the button. The plastic button is physically placed in front of that player who was dealt the highest ranking card face-up.

There are two ways by which the casino ("the house") makes money from a poker game. In high limit Holdem, the casino usually charges each player at the table a monetary amount ("time") during each ½ hour. For example, in \$10/\$20 limit Holdem, the time amount charged each player each 30 minutes may be \$5. In low limit Holdem, the casino usually takes an amount ("the rake") being a certain maximum percentage from each pot at the end of each completed poker hand. For example, in \$5/\$10 limit Holdem, the rake may be up to a maximum of \$5.

The wager options or the wager actions that a player may choose from are fold, check, call, bet or raise.

Fold means that a player does not want to meet the pending bet or raise amount. Such player surrenders his two hole cards; and such player surrenders whatever moneys he has wagered so far up to that betting round of the poker hand.

Check means that a player does not want to bet when there is no pending bet or no pending raise amount.

Call means that a player puts into the pot the same amount as the pending bet or raise amount.

Bet means that a player bets the amount allowed during that betting round. Such bet amount may be the big blind amount or double the big blind amount depending on the betting round.

Raise means that a player bets an amount greater than the pending bet or pending raise amount. Such raise amount may be a multiple of the big blind amount or a multiple of double the big blind amount allowed during that betting round.

Side pots are created as follows. A player must either fold, check, call, bet, or raise. Such player has a certain number of chips in front of him at that time of play. If such player is not able to call the whole pending bet amount or pending raise amount; or if such player is not able to make a whole bet; or if such player is not able to make a whole raise, then the dealer creates a side pot in addition to the already existing main pot. The dealer determines the reduced amount that such player can call, bet or raise. Then the dealer places that amount into the main pot times the number of active players still in the hand at that time. For example, if the all-in player has only \$5 and there are 4 active players in the hand, then the dealer places \$20 into the main pot. The dealer then creates the side pot from the difference that the other 3 active players further call, bet or raise. The all-in player can only win the main pot. The other 3 active players can win the main pot and/or the side pot.

FIGS. 1–5 are top views of poker table 20 showing how a limit Holdem poker hand is played. See FIG. 1. Table 20 is shown as viewed from above. The positions of casino dealer D and of players 1–10 are shown. For explanatory purposes only, it is assumed that player 5 was dealt the highest-ranking card face-up and is therefor designated the button BU for the first hand. Therefore, round white plastic button BU is physically placed in front of player 5. Before any hand of limit Holdem is played, the most important questions asked by dealer D and by all the players at the table are: Which player is the button BU? Which player is the little blind LB? Which player is the big blind BB? In this example, player 5 is the dealer button BU. Player 6 is the little blind LB and places a $5 chip on the table in front of him before the first hand is dealt. Player 7 is the big blind BB and places a $10 chip on the table in front of him before the first hand is dealt.

Dealer D now knows that player 5 is the button. Dealing by dealer D and betting by players 1–10 are performed in a clock-wise manner relative to player 5 who is the button BU. Each hand of limit Holdem comprises up to four betting rounds. The 1st betting round is called the pre-flop betting round; the 2nd betting round is called the post-flop betting round; the 3rd betting round is called the turn betting round; and the 4th betting round is called the river betting round. Button BU remains in place throughout all betting rounds of a poker hand. Before the pre-flop betting round, player 6 (who is the little blind LB) must place a $5 chip in front of him. Player 7 (who is the big blind BB) must place a $10 chip in front of him. Players 6 and 7 have not yet been dealt any cards by dealer D. Dealer D now deals player 6 one hole card face-down; player 7 one hole card face-down; and so on until player 5 (the button BU) is dealt one hole card face-down. Dealer D next deals each player a second hole card face-down in the same clockwise order as before. Player 8 now has three options: he may call the big blind amount of $10; he may raise by the big blind amount and make the bet $20; or he may drop out of the hand and fold by surrendering his two cards to dealer D. After player 8 exercises one of his options, then it is up to player 9 to exercise one of his options, and so on until player 5 (the button BU) exercises one of his options. Player 6 (the little blind LB who has already placed a $5 chip in front of him) may now exercise one of the following options. He may complete his bet to $10 by placing a second $5 chip in front of him if no one before him has raised to $20 or higher. He may call a higher bet if there was at least one raise before him. He may drop out and fold by surrendering his two cards and his $5 chip. If player 6 still has an option to raise and in fact does raise, then all subsequent remaining players must either meet his raise or must fold their hands. Player 7 (the big blind BB who has already placed a $10 chip in front of him) may now exercise one of the following options. He may call if no one has raised before him by pushing his $10 chip forward. He may call a higher bet if there was at least one raise before him. He may drop out of the hand and fold by surrendering his two cards and his $10 chip if there was at least one raise before him. If player 7 still has an option to raise and in fact does raise, then all subsequent remaining players must either meet his raise or must fold their hands. The maximum number of raises allowed by the casino (usually three raises) limits the aforementioned clockwise process. Once the maximum number of raises is reached at a given player, then the subsequent remaining players may only call the prior raises or may fold their hands. The total amount or value of the chips in the middle of table 20 after this 1st or pre-flop betting round is called the pot. The monetary value of the pot is dynamic because it increases each time a player calls, bets or raises. Those players remaining in the hand after the pre-flop betting round are still active players. In this example, the remaining active players after the pre-flop betting round are players 6, 7, 9, 1, 3 and 4 in clockwise order relative to button BU. Players 8, 10, 2 and 5 folded (dropped out of the hand) and are inactive players during the rest of the hand. See FIG. 2.

After the 1st or pre-flop betting round is complete, dealer D burns a card B1 face-down and places it on the table to his left. Dealer D next deals three cards F1, F2 and F3 face-up and places them on the table in front of him. These three cards are called the flop cards. The remaining active players in the hand now commence the 2nd or post-flop betting round. During the post-flop betting round, player 6 may check by not betting or may bet $10. Player 7 may check if and only if player 6 checked, or may call $10 if player 6 bet $10, or may raise to $20 if player 6 bet $10, or may fold if player 6 bet $10. Player 9 may exercise one of the same options as player 7, and so on by players 1 and 3 until player 4 exercises one of his options. If player 4 still has an option to raise and in fact does raise, then players 6, 7, 9, 1 and 3 must meet the raise or must fold. Again, the maximum number of raises allowed by the casino limits the aforementioned clockwise process. Once the maximum number of raises is reached at a given remaining active player, then the subsequent remaining active players may only call or fold. The total amount or value of the chips in the middle of the table after this 2nd or post-flop betting round is the new pot amount. Those players remaining in the hand after the post-flop betting round are active players. In this example, the remaining active players after the post-flop betting round are players 6, 9, 1 and 3 in clockwise order relative to button BU. Players 7 and 4 folded (dropped out of the hand) and are inactive players during the rest of the hand. See FIG. 3.

After the 2nd or post-flop betting round is complete, dealer D burns another card B2 face-down and places it on the table next to burn card B1. Dealer D then deals another card TU face-up and places it on the table in line with flop cards F1, F2 and F3. The remaining active players (6, 9, 1, and 3) now commence the 3rd or turn betting round. During the turn betting round, player 6 may check by betting no amount or may bet $20. Player 9 may check if and only if player 6 checked, or may call $20 if player 6 bet $20, or may raise to $40 if player 6 bet $20, or may fold his hand if player 6 bet $20. Player 1 may exercise the same options as player 9, and so on until player 3 exercises one of his options. If player 3 raises, then players 6, 9, and 1 must either meet the raise or must fold. Again, the maximum number of raises allowed by the casino limits this clockwise process. Once the maximum number of raises is reached at a given player, then the subsequent remaining players may only call or fold. The total amount or value of the chips in the middle of the table after this 3rd or turn betting round is the new pot amount. Those players remaining in the hand after the turn betting round are active players. In this example, the remaining active players after the turn betting round are players 6, 1 and 3 in clockwise order relative to button BU. Player 9 folded (dropped out of the hand) and is an inactive player during the rest of the hand. See FIG. 4.

After the 3rd or turn betting round is complete, dealer D burns another card B3 face-down and places it on the table next to burn cards B1 and B2. Dealer D then deals another card RI face-up and places it on the table in line with cards F1, F2, F3 and T. The remaining active players (6, 1, 3) in the hand now commence the 4th or river betting round. During the river betting round, player 6 may check by betting no amount or may bet $20. Player 1 may check if and only if player 6 checked, or may call $20 if player 6 bet $20, or may raise to $40 if player 6 bet $20, or may fold if player 6 bet $20. Player 3 may exercise one of the same options as player 1. If player 3 raises, then players 6 and 1 must either meet the raise or must fold their hands. Again, the maximum number of raises allowed by the casino limits the aforementioned clockwise process. Once the maximum number of raises is reached at a given remaining active player, then the subsequent remaining active players may only call or fold. The total amount or value of the chips in the middle of the table after this 4th or river betting round is the final pot amount. Those players remaining in the hand after the river betting round are active players. In this example, the remaining active players after the river betting round are players 6, 1 and 3 in clockwise order relative to button BU. See FIG. 5.

After the 4th or river betting round is complete, each remaining active player (6, 1, 3) in clockwise order relative to button B must expose his two cards face-up. Then, upon exposing his two cards face-up, each player must declare to the dealer and to the other players the best poker hand that his two cards make in combination with the five face-up cards F1, F2, F3, TU and RI in the middle of the table. In most casinos, the dealer must read and declare out loud the best poker hand made by each player. In many cases a player will not expose his two cards because such player concedes to himself that his best poker hand does not beat the other exposed poker hands. After all the players' cards are exposed and after all the best poker hands are declared, then the dealer declares the winners of the main pot and any side pots. If two or more players make the same best poker hand, then the main pot and/or any side pots are split between/among such winning players.

Figure 6:
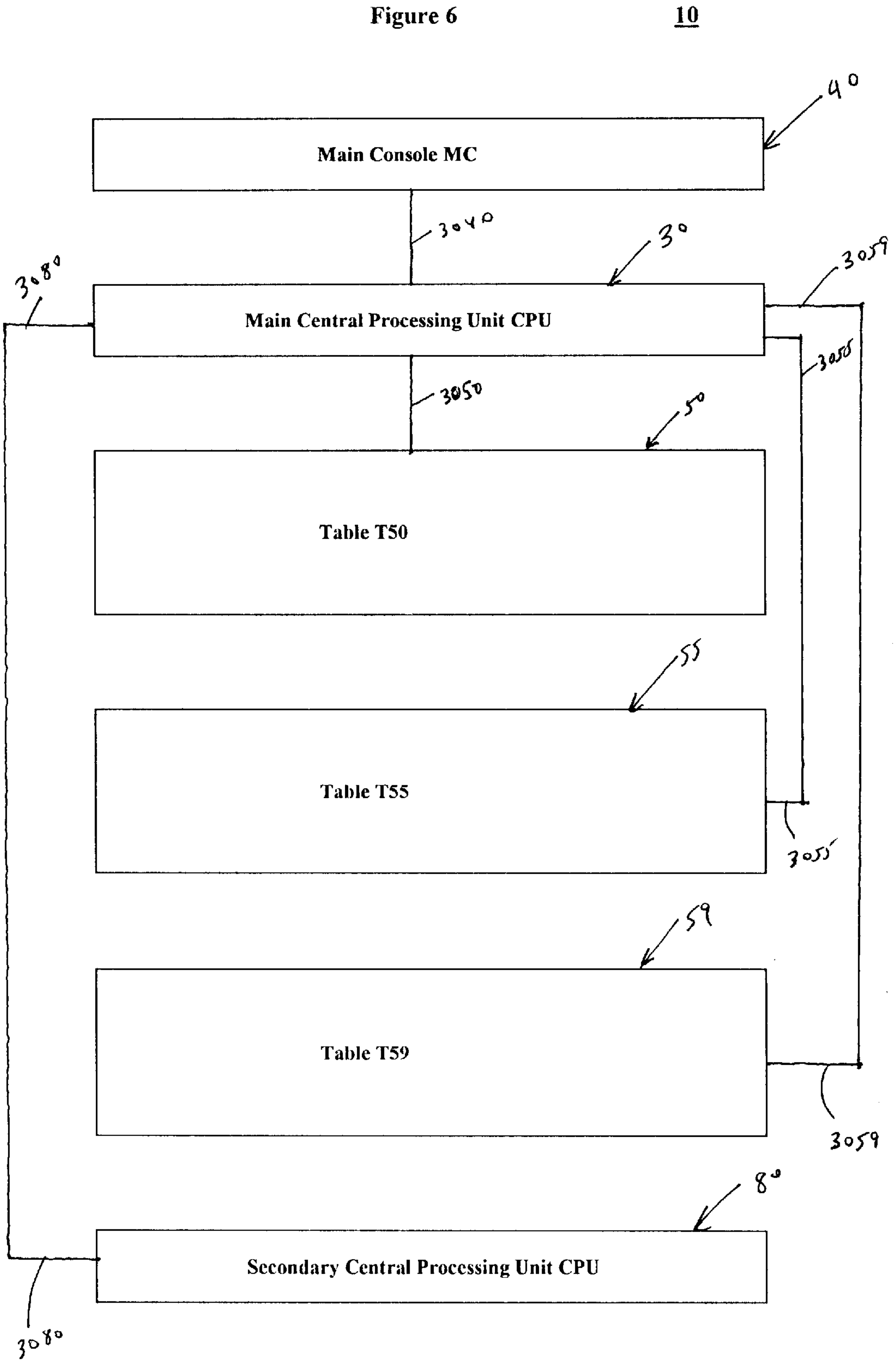
FIG. 6 shows system 10 of the present invention in a multiple poker table embodiment.

FIG. 6 shows system 10 of the present invention in a multiple poker table embodiment. System 10 comprises main central processing unit CPU 30; main console MC 40; poker tables T50–T59; and secondary self-powered central processing unit 80. Main console 40 is connected to CPU 30 by connecting means 3040. Tables T50–T59 are connected to CPU 30 by respective connecting means 3050–3059. Secondary CPU 80 is connected to CPU 30 by connecting means 3080. CPU 30 may send signals to and may receive signals from main console MC 40, tables T50–T59, and secondary CPU 80 via such respective connecting means.

FIG. 7 shows system 10 of the present invention including a detailed view of main console 40 plus the layouts of dealer console 60 and player consoles 70–79 at poker table T50. Main console MC 40 is connected to CPU 30 by connecting means 3040. Dealer console DC 60 is connected to CPU 30 by connecting means 3060. Player consoles PC 70–79 are connected to CPU 30 by a plurality of connecting means 3070–3079, respectively.

FIG. 7 further shows main console MC 40 comprising standard keyboard 41, special keyboard 42, display 43, printer 44, numerical keyboard 45, and card swiper 46. The components of standard keyboard 41, special keyboard 42, and numerical keyboard 45 may be electronically displayed on display 43 and may be operated as a touch-screen responsive system.

FIG. 8 shows a detailed view of dealer console DC 60 of the present invention. Dealer console DC 60 comprises special keyboard 61, display 62, printer 63, standard keyboard 64, numerical keyboard 65, and card swiper 66. The components of special keyboard 61, standard keyboard 64, and numerical keyboard 65 may be electronically displayed on display 62 and may be operated as a touch-screen responsive system.

FIG. 9 shows a detailed view of player console PC 70 of the present invention. Payer console PC 70 comprises special keyboard 701, display 702, printer 703, numerical keyboard 704, and card swiper 705. The components of special keyboard 701 and numerical keyboard 704 may be electronically displayed on display 702 and may be operated as a touch-screen responsive system.

See FIG. 7 again. Special keyboard 42 of main console MC 40 includes push button 421. When a new player wants to enter a poker game, the main console operator presses push button 421. Then the operator enters the name of the new player onto standard keyboard 41 or enters the previously assigned casino ID number of the new player onto numerical keyboard 45. Then the operator presses enter button 411 on standard keyboard 41. In the alternative, the operator may swipe the previously issued casino plastic ID card of the new player onto card swiper or magnetic strip reader 46. The operator then presses enter button 411. Upon enter button 411 being pressed, a signal is sent to CPU 30 for storage relating to the entered information. CPU 30 then sends a signal to display 43 to display the name and the assigned casino ID number of the new player.

Special keyboard 42 of main console MC 40 also includes push buttons 422 further including push button **422*a* for limit Holdem, push button 422*b* for limit Stud, and push button 422*c* for limit Omaha. The new player tells the operator the specific poker game that he wants to play. The operator presses the specific push button 422 relating to the desired poker game (in this example being limited Holdem) Then the operator presses enter button 411. Upon enter button 411 being pressed, a signal is sent to CPU 30 for storage relating to the entered information. CPU 30 then sends a signal to display 43** to display the desired poker game (in this example being limit Holdem).

Special keyboard 42 of master console MC 40 also includes push buttons 423 further including push button **423*a* for $5/$10 limit; push button 423*b* for $10/$20; push button 423*c* for $15/$30; push button 423*d* for $20/$40; push button 423*e* for $30/$60; and push button 423*f* for $50/$100. The new player tells the operator the specific limit that he wants to play. The operator then presses the specific push button 423 relating to the desired limit (in this example being $10/$20). The operator then presses enter button 411. Upon enter button 411 being pressed, a signal is sent to CPU 30 for storage relating to the entered information. CPU 30 then sends a signal to display 43** to display the specific limit (in this example being $10/$20).

Special keyboard 42 of master console 40 also includes push buttons 424 further including push button **424*a* for $50 initial buy-in amount; push button 424*b* for $100; push button 424*c* for $200; push button 424*d* for $300; push button 424*e* for $400; and push button 424*f* for $500. The new player tells the operator the specific initial buy-in amount that he wants to purchase. The operator then presses the specific push button 425 relating to the desired initial buy-in amount (in this example being $500). In the alternative, the operator enters the specific initial buy-in amount onto numerical keyboard 45. Then the operator presses enter button 411. Upon enter button 411 being pressed, a signal is sent to CPU 30 for storage relating to the entered information. CPU 30 then sends a signal to display 43** to display the specific initial buy-in amount (in this example being $500).

Special keyboard 42 of main console MC 40 also includes push button 425. The operator confirms that the cumulative information displayed on display 43 is correct being the name of the new player, the assigned casino ID number of the new player, the specific game desired, the specific monetary limit desired, and the specific buy-in amount desired. The operator then presses push button 425. Upon enter button 425 being pressed, a signal is sent to CPU 30 for storage confirming the entered information. CPU 30 then sends a signal to display means 43 to also display the number of the table and the number of the seat assigned to the new player in addition to the information already being displayed. CPU 30 also sends a signal to main printer 44 to print a 1st paper slip of the displayed information. CPU 30 also sends a signal to dealer console DC 60 at assigned table T50. Dealer printer 63 prints a 2nd paper slip of the same displayed information and dealer display 62 displays the same displayed information. The operator then gives the 1st printed paper slip to the new player who in turn presents it to the dealer at assigned poker table T50.

See FIG. 8. Special keyboard 61 of dealer console DC 60 includes ten push buttons 6100–6109 for receiving signals from CPU 30 and for sending signals to CPU 30. Push buttons 6100–6109 visually indicate by a 1st color (such as green) which of player consoles PC 70–79 is being assigned to the new player. Each of push buttons 6100–6109 also receives signals from CPU 30 for visually indicating by a 2nd color (such as white) which of player consoles PC 70–79 were already assigned to the seated players. When the new player presents his 1st printed paper slip to the dealer, the dealer then compares it to his own 2nd printed paper slip to confirm that the new player came to the correct assigned table. Once the new player sits at assigned player console PC 70–79, then the dealer pushes appropriate push button 6100–6109 to send a signal to CPU 30. CPU 30 then sends a signal to appropriate push button 6100–6109 to change its displayed color from green to white. CPU 30 also sends a signal to activate assigned player console PC 70–79 of the new player. The new player is now ready to play the next poker hand.

Special keyboard 61 of dealer console DC 60 also includes ten push buttons 6110–6119 for sending a signal to CPU 30 relating to the player console positions of the button BU, the little blind LB, and the big blind LB for the next hand to be played. CPU 30 then sends a signal to those three push buttons to visually indicate by a 3rd color (such as blue) that they represent the button BU, the little blind LB, and the big blind BB. CPU 30 also sends signals to the displays of the three player consoles PC 70–79 which are going to be the button B, the little blind LB, and the big blind BB to display the words "Button", "Little Blind", and "Big Blind", respectively.

Special keyboard 61 of dealer console DC 60 also includes push buttons 6120–6125 for sending a signal to CPU 30 relating to the winning player(s) of the main pot, the 1st side pot, if any, and up to the 5th side pot, if any. CPU 30 then sends a signal to each winning player's console PC 70–79 to display the new stored stack amounts of the winning players.

Special keyboard 61 of dealer console DC 60 also includes push button 6130. When a seated player wants to terminate play and leave the game, the dealer presses the white-lit button 6100–6109 corresponding to that player's console. The dealer then presses button 6130 for sending a signal to CPU 30 indicating that such player wants to leave the game. CPU 30 then sends a signal to dealer printer 63 to print a 3rd paper slip with the name of the leaving player, the assigned casino ID number of the leaving player, the table number/player console number of the leaving player, and the final monetary value of the stored stack of the leaving player. CPU 30 also sends a signal to the player console of the terminating player to de-activate such player console. CPU 30 also sends a signal to the button 6100–6109 corresponding to the leaving player to turn off the white light at such button.

See FIG. 9 again. Special keyboard 701 of player console PC 70 includes a plurality of push buttons 7010–7018 for allowing the player assigned to player console PC 70 to express his wager action during a specific poker hand or in between poker hands. CPU 30 sends a signal to player console PC 70 to enable buttons 7010–7018. If buttons 7010–7018 are not enabled, then the player sitting at player console PC 70 cannot act At the same time, CPU 30 sends signals to all other player consoles at the table to dis-enable or de-activate all other similar player console buttons. This way no other player at the table can act before the player at player console PC 70 acts. For explanatory purposes only, it is assumed that the player at player console PC 70 is the player who must act.

Push button 7010 is the "check" button. When the player presses check button 7010, a signal is sent to CPU 30. CPU 30 then sends a signal to player display 702 to display the word "check". When the current player checks, it means that all prior players did not bet and that the current player also does not want to bet. It may also mean that the current player is the 1st player to bet after button BU and that such current player does not want to bet. The amount of the current player's stored stack amount/account remains the same and the amount of the main pot and all side pots remain the same. CPU 30 then sends a signal to the next player console to enable or activate such next player console buttons and to dis-enable or deactivate all other player consoles.

Push button 7011 is the "call" button. When the player presses call button 7011, a signal is sent to CPU 30. CPU 30 then sends a signal to player display 702 to display the word "call" and the amount of the call. When the current player calls, it means that at least one prior player made a bet or raise and that the current player wants to meet such pending bet or raise amount. CPU 30 deducts the call amount from the current player's stored stack amount. CPU 30 also sends a signal to dealer display 62 to display the new amount of the main pot and all side pots. CPU 30 then sends a signal to the next player console to enable or activate such next player console buttons and to dis-enable or de-activate all other player consoles.

Push button 7012 is the "bet" button. When the player presses bet button 7012, a signal is sent to CPU 30. CPU 30 then sends a signal to player display 702 to display the word "bet" and the amount of the bet. When the current player bets, it means that all prior players checked and that the current player wants to bet. It may also mean that the current player is the 1st player to act after button BU. CPU 30 deducts the bet amount from the current player's stored stack. CPU 30 also sends a signal to dealer display 62 to display the new amount of the main pot and all side pots. CPU 30 then sends a signal to the next player console to enable or activate such next player console buttons and to dis-enable or de-activate all other player consoles.

Push button 7013 is the "raise" button. When the player presses raise button 7013, a signal is sent to CPU 30. CPU 30 then sends a signal to player display 702 to display the word "raise" and the amount of the raise bet. When the current player raises, it means that at least one prior player made a bet. It may also mean that at least one prior player made a raise. CPU 30 deducts the raise amount from the current player's stored stack. CPU 30 also sends a signal to dealer display 62 to display the new amount of the main pot and all side pots. CPU 30 then sends a signal to the next player console to enable or activate such next player console buttons and to dis-enable or de-activate all other player consoles.

Push button 7014 is the "fold" button. When the player presses fold button 7014, a signal is sent to CPU 30. CPU 30 then sends a signal to player display 702 to display the word "fold". When the current player folds, it means that at least one prior player made a bet or a raise, and that the current player does not want to meet the bet or raise. The current player discards his two down or hole cards to the dealer. CPU 30 maintains the player's stored stack amount intact. CPU 30 also sends a signal to dealer display 62 to display the same prior amounts of the main pot and all side pots. CPU 30 then sends a signal to the next player console to enable or activate such next player console buttons and to dis-enable or deactivate all other player consoles.

The betting information sent by player console PC 70 to CPU 30 relating to the action of the player by way of a check, fold, call, bet or raise is known as wager information or wager data.

Push button 7015 is the "re-buy" button. When the player wants to purchase more chips, i.e. to credit the amount of his stored stack, the player presses re-buy button 7015, thereby sending a signal to CPU 30. CPU 30 then sends a signal to dealer display 62 to display the player console number of the player that wants to re-buy chips and the word "re-buy". CPU also sends a signal to player display 702 to display the word "re-buy". The dealer then asks the player for the amount of chips wanted. The dealer then enters the amount on numerical keyboard 65 and then presses enter button 65. A signal is sent to CPU 30 to cause main display 43 to display the table number, the player console number, and the amount of chips being bought by the player. A dealer's assistant then gets the cash from the player. The main console operator then presses enter button 411 on main console MC 40. CPU 30 then stores the credited stack amount of that player. CPU also sends a signal to player display 702 to display the credited stack amount of that player. CPU 30 also sends a signal to dealer display 62 to clear the display of the completed transaction. CPU 30 also sends signals to main printer 44 and to dealer printer 63 to print the name, table number, player console number, and the re-buy amount on respective paper slips. The main console operator keeps the slip printed on main printer 44 and the dealer gives to the player the slip printed on dealer printer 63. A player may re-buy in between poker hands and during a current poker hand if such player is not in the current poker hand.

Push button 7016 is the "terminate play" button. When the player wants to terminate play, the player presses terminate play button 7016, thereby sending a signal to CPU 30. CPU 30 then sends a signal to dealer display 62 to display the player console number of the player that wants to terminate play and the words "terminate play". CPU 30 also sends a signal to player display 702 to display the words "terminate play". CPU 30 also sends a signal to main display 43 to display the table number, the player console number, and the words "terminate play". CPU also sends signals to main printer 44 and to dealer printer 63 to print the name, table number, player console number, and the final stored stack amount on respective paper slips. The dealer gives to the terminating player the slip printed on dealer printer 63. The main console operator keeps the paper slip printed on main printer 44. When the terminating player brings his printed paper slip to the main console operator, the operator initials the player's printed paper slip and the player can go to the cashier to cash out. The operator keeps his printed paper slip. A player may terminate play in between poker hands or during a current poker hand if such player is not an active player in the current poker hand.

Push button 7017 is the "tip" button. When a winning player wants to tip the dealer, the player presses tip button 7017, thereby sending a signal to CPU 30. CPU 30 then sends a signal to dealer display 62 to display the cumulative dealer tips up to and including such player tip. CPU also sends a signal to player display 702 to display the debited stored stack amount of that player. A player may tip the dealer in between poker hands, during a current poker hand if such player is not in the current poker hand, and at the end of a winning poker hand.

Push button 7018 is the "negate" button. Whenever a player wants to negate the prior action taken by that player, i.e., by previously pressing any of the aforementioned buttons, the player may press negate button 7018 before the next player acts to send a signal to CPU 30. The player may then press any of the buttons 7010–7017 as above-mentioned. If the next player has already acted, then pressing negate button 7018 will not negate the wager action of that player.

FIGS. 10*a*–18*a* show various touch-responsive screens of player display 702 allowing the respective wager actions or other actions by the player at player console 70 according to the present invention. In each case the player starts with $100 in his stored stack account. In FIG. 10*a* the player checks. In FIG. 11*a* the player calls the amount of $20. In FIG. 12*a* the player bets the amount of $20. In FIG. 13*a* the player raises the amount of $40. In FIG. 14*a* the player folds. In FIG. 15*a* the player re-buys the amount of $100. In FIG. 16*a* the player terminates play. In FIG. 17*a* the player tips the dealer the amount of $1. In FIG. 18*a* the player first bets the amount of $20 but then changes his mind and immediately negates such wager action. All of the above wager actions or other actions are effected by the player touching player display 702 at the respective command word.

FIGS. 10*b*–18*b* show the various output screens of dealer display 62 relating to the respective wager actions or other actions by the player at player console 70 according to the present invention. In FIGS. 10*b*–14*b* the pot starts with amount of $150. In FIGS. 15*b*–18*b* the amounts stated relate only to the player at player console PC 70 and do not relate to the overall pot amount.

Figure 19A:
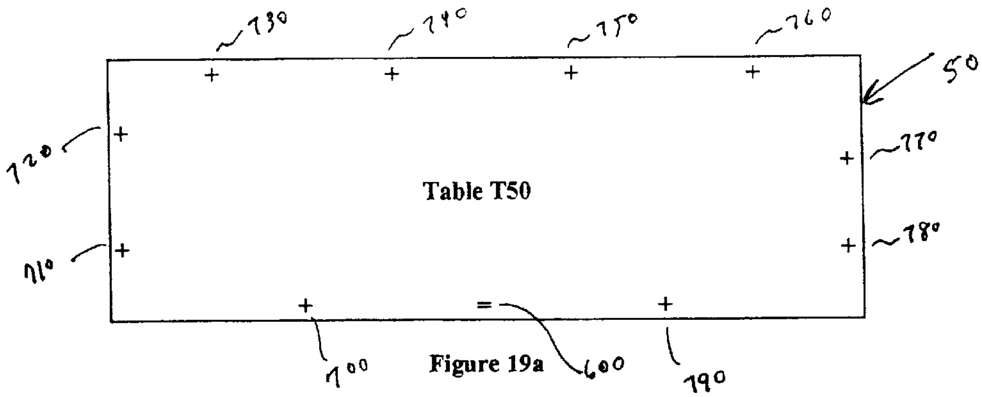
FIGS. 19*a*–19*c* show the modular plug-in feature of dealer console 60 and player console 70 onto poker table T51 according to the present invention.
Figure 19B:
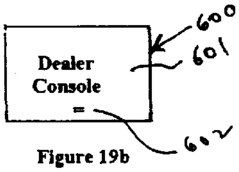
Figure 19C:
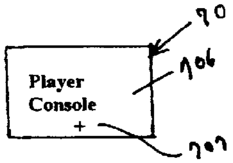

FIGS. 19*a*–19*c* show the modular plug-in feature of dealer DC console 60 and player PC console 70 in relation to poker table T50 according to the present invention. FIG. 19*a* shows poker table T50, "=" shaped connector 600 for connecting to dealer console DC 60, and "+" shaped connectors 700–790 for respectively connecting to player consoles PC 70–79. FIG. 19*b* shows the back side 601 of substantially flat dealer console 60 and "=" shaped connector 602 for connecting to "=" shaped connector 600 located on poker table T50. FIG. 19*c* shows the back side 706 of substantially flat player console 70 and "+" shaped connector 707 for connecting to "+" shaped connector 700 on poker table T50.

Figure 20A:
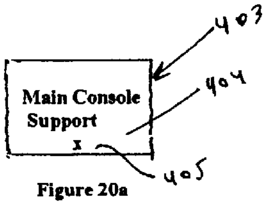
FIGS. 20*a*–20*b* show the modular plug-in feature of main console 40 onto its support structure according to the present invention.
Figure 20B:
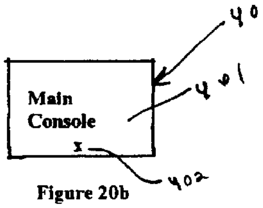

FIGS. 20*a*–20*b* show the modular plug-in feature of main console MC 40 in relation to its support table, podium or other structure according to the present invention. FIG. 20*a* shows the back side 404 of main console support 403 and "×" shaped connector 405 for connecting to main console MC 40. FIG. 20*b* shows the back side 401 of substantially flat main console 40 and "×" shaped connector 402 for connecting to "×" shaped connector of main console support 403.

Figure 21A:
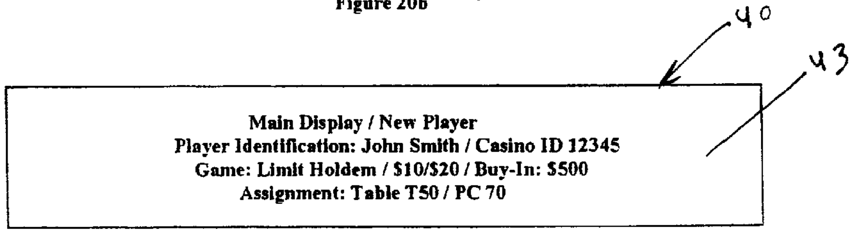
FIGS. 21*a*–21*b* show the informational screens of main display 43 relating to the assignment of a new poker player and relating to the termination of an already assigned poker player according to the present invention.
Figure 21B:
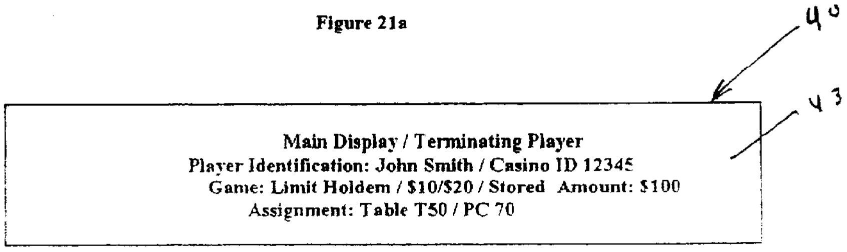

FIGS. 21*a*–21*b* show the output screens of main display 43 relating to the assignment of a new poker player and relating to the termination of an already assigned poker player according to the present invention. FIG. 21*a* shows main display 43 of main console MC 40 displaying the name of the new player, the casino ID number of such player, the game to be played by such player, the game limit to be played by such player, the initial buy-in amount of such player, and the poker table/player console assignment of such player. FIG. 21*b* shows main display 43 of main console MC 40 displaying the name of the terminating player, the casino ED number of such player, the game already played by such player, the game limit already played by such player, the final stored amount of such player, and the poker table/player console where such player had been assigned.

FIGS. 22*a*–22*c* show the displays of player consoles PC 70–72 indicating the button BU, the little blind LB, and the big blind BB designations at the beginning of a sample poker hand according to the present invention. In FIG. 22*a* the stored stack account in the original amount of $100 of the player at player console PC 70 is not deducted any amount because such player console is designated the button BU console. In FIG. 22*b* the stored stack account in the original amount of $100 of the player at player console PC 71 is deducted the amount of $5 because such player console is designated the little blind LB console. In FIG. 22*c* the stored stack account in the original amount of $100 of the player at player console PC 72 is deducted the amount of $10 because such player console is designated the big blind BB console.

While the present invention has been described in terms of specific illustrative embodiments, it will be apparent to those skilled in the art that many other embodiments and modifications are possible within the spirit and scope of the disclosed principle.

What is claimed is:

1. A system for allowing a plurality of players to play poker at a poker table, said system comprising:

a central processing unit;

a plurality of player consoles, said player consoles being distributed at such poker table in a manner to accommodate such players; and a plurality of first interconnecting means for connecting said central processing unit to each of said player consoles;

wherein during a betting round of a poker hand said central processing unit responds to wagering information being sent by a particular player console; and wherein during such betting round of such poker hand said central processing unit does not respond to any wagering information being sent by the other player consoles.

2. The system of claim 1 wherein each of said player consoles further comprises display means controlled by said central processing unit for displaying wager action be it check, fold, call, bet or raise.

3. The system of claim 1 wherein each of said player consoles further comprises display means controlled by said central processing unit for displaying an amount of money remaining in a stored account of each player.

4. The system of claim 1 wherein each of said player consoles further comprises tipping means controlled by said central processing unit for allowing each winning player to tip the dealer.

5. The system of claim 1 wherein each player has a stored account and each of said player consoles further comprises credit means controlled by said central processing unit for allowing each player to credit his stored player account.

6. The system of claim 1 wherein each of said player consoles further comprises terminating means controlled by said central processing unit for allowing each player to terminate play and to dis-enable his player console.

7. The system of claim 1 wherein each of said player consoles further comprises display means controlled by said central processing unit for designating a button player console, a little blind player console, and a big blind player console at the beginning of each poker hand.

8. The system of claim 1 wherein said central processing unit computes and stores a rake amount earned by a casino at the end of each poker hand and deducts such rake amount from the final value of a pot at the end of each poker hand.

9. The system of claim 1 wherein said central processing unit computes and stores the cumulative value of all tips given to a dealer up to the end of each poker hand.

10. The system of claim 1 wherein said central processing unit computes and stores the cumulative value of all rake amounts earned by a casino up to the end of each poker hand.

11. The system of claim 1 wherein said central processing unit enables the player console following a big blind player console and dis-enables every other player console at the beginning of each poker hand.

12. The system of claim 1 also comprising a secondary central processing unit being responsive to said central processing unit for continually storing a value of a stored account for each player, the cumulative value of all tips given to a dealer, and the cumulative value of all rake amounts earned by a casino.

13. The system of claim 1 further comprising:

a dealer console at such poker table; and second interconnecting means for connecting said dealer console to said central processing unit;

wherein said dealer console further comprises display means controlled by said central processing unit for displaying the value of a pot during each betting round of each poker hand.

14. The system of claim 1 further comprising:

a main console; and third interconnecting means for connecting said main console to said central processing unit;

wherein said main console further comprises display means controlled by said central processing unit for displaying information relating to each new player, a buy-in amount of each new player, and an assigned seat of each new player.

15. The system of claim 1 further comprising:

a main console; and third interconnecting means for connecting said main console to said central processing unit;

wherein said main console further comprises printing means controlled by said central processing unit for printing information relating to each new player, a buy-in amount of each new player, and an assigned seat of each new player.

16. The system of claim 1 further comprising:

a main console; and third interconnecting means for connecting said main console to said central processing unit;

wherein said main console further comprises display means controlled by said central processing unit for displaying the cumulative value of all tips given to a dealer and the cumulative value of all rake amounts earned by a casino.

17. The system of claim 1 further comprising:

a main console; and third interconnecting means for connecting said main console to said central processing unit;

wherein said main console further comprises printing means controlled by said central processing unit for printing the cumulative value of all tips given to a dealer and the cumulative value of all rake amounts earned by a casino.

18. The system of claim 13 wherein said dealer console further comprises means controlled by said central processing unit for allowing activation of each player console at the beginning of play of each assigned player at his assigned player console.

19. The system of claim 13 wherein said dealer console further comprises printing means controlled by said central processing unit for printing information relating to each player and the final amount of a stored account of each player upon termination of play by each player.

20. The system of claim 13:

wherein each of said player consoles further comprises display means controlled by said central processing unit for visually indicating its position as button player console, little blind player console, or big blind player console at the beginning of each poker hand; and wherein said dealer console further comprises means for causing said central processing unit to activate said button player console display, little blind console display, and big blind console display at the beginning of each poker hand.

21. The system of claim 13 further comprising:

a main console; and third interconnecting means for connecting said main console to said central processing unit;

wherein said main console further comprises activating means controlled by said central processing unit for activating said dealer console at the beginning of play at such poker table.

22. A system for playing poker, said system comprising:

a central processing unit;

a plurality of player consoles; and a plurality of first interconnecting means for connecting said central processing unit to each of said player consoles;

wherein said central processing unit is capable of sending a signal to enable a particular player console so that said particular player console may send wagering information to said central processing unit only while said particular player console is enabled; and wherein said central processing unit is capable of sending signals to simultaneously dis-enable the other player consoles so that said other player consoles may not be able to send any wagering information to said central processing unit while said other player consoles are dis-enabled.

23. A system for playing poker, said system comprising:

a central processing unit;

a plurality of player consoles; and a plurality of first interconnecting means for connecting said central processing unit to each of said player consoles;

wherein said central processing unit is capable of enabling a particular player console so that said enabled player console may send wagering information to said central processing unit only while said particular player console is enabled; and wherein said central processing unit is capable of simultaneously dis-enabling the other player consoles so that said other dis-enabled player consoles may not be able to send any wagering information to said central processing unit while said other player console are dis-enabled.

24. A system for playing poker, said system comprising:

a central processing unit;

a plurality of player consoles; and a plurality of first interconnecting means for connecting said central processing unit to each of said player consoles;

wherein during a betting round of a poker hand said central processing unit central processing unit responds to wagering information being sent by a particular player console; and wherein during such betting round of such poker hand said central processing unit does not respond to any wagering information being sent by the other player consoles.

25. A system for allowing a plurality of players to play poker against each other at each of several poker tables, said system comprising:

a central processing unit;

a plurality of player consoled being located at each such poker table;

a plurality of first interconnecting means for connecting each player console at each such poker table to said central processing unit;

wherein each player console at each such poker table further comprises means controlled by said central processing unit for allowing each such player console at each such poker table to send wagering information relating to a check, fold, call, bet or raise to said central processing unit when such player console is enabled by said central processing unit, all other player consoles at such poker table being simultaneously dis-enabled by said central processing unit while such player console is enabled.

26. A system for allowing a plurality players to play a poker hand against each other at a poker table, said system comprising:

a central processing unit;

a plurality of modular player consoles each being removably attached to such poker table; and a plurality of first interconnecting means for connecting each of said player consoles at such poker table to said central processing unit;

wherein each of said player console further comprises means controlled by said central processing unit for allowing each active player remaining in the poker hand to check, fold, call, bet or raise when said player's console is enabled by said central processing unit; all other player consoles being simultaneously dis-enabled by said central processing unit; said central processing unit sequentially enabling and dis-enabling the player consoles of the active players remaining in the poker hand.

27. The system of claim 26:

wherein said central processing unit computes and stores information relating to an amount of money remaining in an account of each player; and wherein said central processing unit retains said stored amount if the active player checks or folds; and wherein said central processing unit deducts the amount of the call, bet or raise from said stored amount if the active player calls, bets or raises, respectively.

28. The system of claim 27 wherein said central processing unit computes and stores information relating to said deducted amounts for computing the cumulative value of a pot.

29. A system for allowing a plurality of players to play poker at a poker table, said system comprising:

a central processing unit;

a plurality of modular player consoles, said player consoles being removably attached to such poker table and being distributed at such poker table to accommodate such players; and a plurality of first interconnecting means for connecting said central processing unit to each of said player consoles;

wherein said central processing unit is capable of sending a signal to enable a particular player console so that said particular player console may send wagering information to said central processing unit only while said particular player console is enabled; and wherein said central processing unit is capable of sending signals to simultaneously dis-enable the other player consoles so that said other player consoles may not send any wagering information to said central processing unit while said other player consoles are dis-enabled.

30. A system for allowing a plurality of players to play poker at a poker table, said system comprising:

a central processing unit;

a plurality of modular player consoles, said player consoles being removably attached to such poker table and being distributed at such poker table to accommodate such players; and a plurality of first interconnecting means for connecting said central processing unit to each of said player consoles;

wherein said central processing unit is capable of enabling a particular player console so that said enabled player console may send wagering information to said central processing unit only while said particular player console is enabled; and wherein said central processing unit is capable of simultaneously dis-enabling the other player consoles so that said other dis-enabled player consoles may not be able to send any wagering information to said central processing unit while said other player consoles are dis-enabled.

31. The system of claim 27 wherein said central processing unit deducts a time amount earned by a casino per unit time from a stored stack account of each player.

32. The system of claim 24 wherein said central processing unit tabulates and stores the number of poker hands played per unit time.

33. The system of claim 13:

wherein said dealer console further comprises card swiping means controlled by said central processing unit for accessing information relating to the dealer; and wherein said central processing unit stores such dealer information, dealer log-in time, and dealer log-out time.

34. The system of claim 25 wherein said central processing unit assigns to each new player a poker table and a player console at such poker table in order to even out the number of players per poker table.

35. The system of claim 2 wherein each of said player consoles further comprises display means being capable of displaying a pending wager action and a pending wager amount at any given stage of a betting round, said information being displayed only at said particular player console at such given stage.

36. The system of claim 14:

wherein said main console further comprises card swiping means controlled by said central processing unit for accessing information relating to each new player; and wherein said central processing unit stores such new player information.

37. The system of claim 1 wherein each of said player consoles further comprises touch-responsive display means being capable of sending wager information to said central processing unit.

* * * * *